(12) United States Patent
Mund et al.

(10) Patent No.: US 9,599,476 B2
(45) Date of Patent: Mar. 21, 2017

(54) SEAMLESS NETWORK GENERATION

(75) Inventors: Heiko Mund, Hildesheim (DE); Hannes Scharmann, Hildesheim (DE)

(73) Assignee: TomTom Global Content B.V., Eindhoven (NL)

( * ) Notice: Subject to any disclaimer, the term of this patent is extended or adjusted under 35 U.S.C. 154(b) by 231 days.

(21) Appl. No.: 13/977,891

(22) PCT Filed: Dec. 30, 2010

(86) PCT No.: PCT/EP2010/070941
§ 371 (c)(1),
(2), (4) Date: Feb. 10, 2014

(87) PCT Pub. No.: WO2012/089272
PCT Pub. Date: Jul. 5, 2012

(65) Prior Publication Data
US 2014/0163875 A1 Jun. 12, 2014

(51) Int. Cl.
*G01C 21/26* (2006.01)
*G01C 21/32* (2006.01)
*G09B 29/10* (2006.01)

(52) U.S. Cl.
CPC ............. *G01C 21/26* (2013.01); *G01C 21/32* (2013.01); *G09B 29/106* (2013.01)

(58) Field of Classification Search
CPC .................................. G01C 21/26; G01C 21/32
See application file for complete search history.

(56) References Cited

U.S. PATENT DOCUMENTS

| 6,047,234 | A  | * | 4/2000 | Cherveny et al. | 701/451 |
|-----------|----|---|---------|------------------|---------|
| 6,154,152 | A  | * | 11/2000 | Ito              | 340/988 |
| 6,470,265 | B1 | * | 10/2002 | Tanaka           | 701/532 |
| 2002/0128768 | A1 | * | 9/2002 | Nakano et al.    | 701/202 |
| 2002/0177947 | A1 | * | 11/2002 | Cayford          | 701/209 |
| 2004/0122590 | A1 | * | 6/2004 | Ito et al.       | 701/208 |

(Continued)

FOREIGN PATENT DOCUMENTS

| DE | 10030932 A1 | 1/2002 |
| DE | 102008012654 A1 | 3/2009 |
| EP | 1939589 A1 | 7/2008 |

OTHER PUBLICATIONS

Bruntrup R et al: "Incremental map generation with GPS traces", Intelligent Transportation Systems , 2005. Proceed Ings. 2005 IEEE Vienna, Austria Sep. 13-16, 2005, Piscataway, NJ, USA, IEEE, Sep. 13, 2005 (Sep. 13, 2005) , pp. 413-418, XP010843059, 001 : 10 .1109/ ITSC .2005 .1520084 ISBN : 978-0-7803-9215-1.

(Continued)

*Primary Examiner* — John Q Nguyen
*Assistant Examiner* — Anshul Sood

(57) ABSTRACT

A system and method for generating a seamless road network of a large geographical area includes a plurality of GPS probe traces extending across a geographical area. The probe traces are divided into sub-sets base on criteria, such as accuracy. A plurality of threads simultaneously employ the sub-sets traces to generate an independent network of the entire geographical area. The networks generated using sub-sets having a high accuracy are preferred over networks generating using sub-sets having a lower accuracy. The independent networks are combined to form a seamless networks of road segments.

15 Claims, 3 Drawing Sheets

(56) References Cited

U.S. PATENT DOCUMENTS

| | | | |
|---|---|---|---|
| 2005/0222768 A1* | 10/2005 | Tauchi et al. | 701/214 |
| 2006/0047420 A1* | 3/2006 | Tanaka | 701/208 |
| 2006/0111837 A1* | 5/2006 | Tauchi | 701/210 |
| 2011/0071756 A1* | 3/2011 | Stahlin | 701/208 |
| 2012/0277993 A1* | 11/2012 | Mund | 701/450 |
| 2013/0021382 A1* | 1/2013 | Morlock et al. | 345/672 |
| 2014/0044317 A1* | 2/2014 | Mund et al. | 382/113 |

OTHER PUBLICATIONS

International Search Report issued Oct. 14, 2011 for International Application No. PCT/EP2010/070940.
International Search Report issued Oct. 14, 2011 for International Application No. PCT/EP2010/070941.

* cited by examiner

SEAMLESS NETWORK GENERATION

CROSS-REFERENCES TO RELATED APPLICATIONS

This application is the National Stage of International Application No. PCT/EP2010/070941 filed Dec. 30, 2010 and designating the United States. The entire content of this application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND OF THE INVENTION

Field of the Invention

This invention relates to digital maps of the type for displaying networks of roads and other features of geographical areas, and more specifically, toward a system and method for generating, extending, and revising networks of large geographical areas.

Related Art

Navigation systems, electronic or digital maps, and geographical positioning devices are increasingly used by travelers to assist with various navigation functions, such as to determine the overall position and orientation of the traveler and/or vehicle, find destinations and addresses, calculate optimal routes, and provide real-time driving guidance. Current navigation systems and devices include Personal Navigation Systems (PNAV), such as dedicated handheld navigation systems, Personal Digital Assistance (PDAs), mobile telephones provided with a navigation module, as well as in-car navigation systems and devices, such as those manufactured by TomTom N.V. (www.tomtom.com). Typically, the navigation system includes a small display screen or graphic user interface that portrays a network of streets as a series of line segments, and other features of a geographical area. The traveler can then be generally located on the digital map.

FIG. 1 shows a digital vector map of a road network, including major motorways, secondary roads, tertiary streets, and alleys. As will be appreciated by reference to these figures, in combination with the expense and effort required to produce digital maps, it may be the case that an existing roadway map or network is incomplete in its depiction of all roadways or paths within a given region. Furthermore, due to the evolving nature of networks which may include but are not limited to roadways and paths, changes may occur over time such that an existing digital map may no longer accurately portray current conditions. Thus, digital maps are often extended and new digital maps are occasionally generated.

Digital maps are expensive to generate, extend, and revise, since exhibiting and processing road information is very costly. Surveying methods or digitizing satellite images are commonly employed techniques for generating a digital map. One example of a non-incremental map generation process developed and currently used by TomTom N.V includes collecting a plurality of probe data over a period of time, providing the plurality probe data as a set of probe data to a processor, and processing the set of probe data to generate, extend, or revise a digital map. Probe traces are a plurality of sequential location measurements from location sensors housed in a plurality of vehicles or carried by a plurality of pedestrians. For example, the location sensors can be satellite navigation signal receivers, e.g. GPS systems.

However, for larger geographical areas, such as an entire country or world, the map generation systems and methods of the prior art are less efficient and reliable. The computation capacity of existing computers is not sufficient to generate digital maps in real-time when the system employs a single thread. One method currently used to generate road networks extending across large geographical areas is to divide the large geographical area into several tiles. Each of the tiles includes traces, and typically only portions of traces, extending across the tile. Each tile includes a single thread employing the trace or portion of the trace disposed in the single tile and generating a road segments limited to the single tile. The thread generates the road segments of the single tile independent of the other traces and independent of other portions of traces and traces disposed in other tiles. In other words, each thread employs the traces or portions of trace of only one of the tiles at a time to generate road segments of the tile independent of the other threads and other tiles. The threads can employ a map generation method to generate the independent road segments of the tile. Test results indicate the road segments generated in a single tile are relatively accurate.

However, to form a single road network of the entire large geographical area, the independent road segments of the individual tiles must be seamed together. Errors typically occur during the seaming step, when adjacent individual tiles are combined together. For example, the road segments of one tile may include two road segments disposed close to one another, whereas an adjacent tile includes only a single road segment. Thus, when the adjacent tiles are seamed together, the resulting road network of the large geographical area has an obvious error at the boundary between adjacent tiles. A second example error occurs when the geographic area includes a road disposed along or crossing a boundary between two adjacent tiles, and thus the probe data includes numerous traces extend across the adjacent tiles. When the tiles of the second example are seamed together, typically two road segments are generated, including one road segment in each adjacent tile, but in reality only one road segment exists. Similar errors occur at corners of adjacent tiles. Such errors typically occur with all types of network generation methods, both incremental and non-incremental, when attempting to generate a road network of a large geographical area. Examples of incremental map generation algorithms can be found in U.S. Pat. No. 6,385,539 and in the Applicant's co-pending PCT application titled "INCREMENTAL MAP GENERATION, REFINEMENT AND EXTENSION WITH GPS TRACES" by inventor H. Mund (PCT/EP2009/063938 filed 22 Oct. 2009).

SUMMARY OF THE INVENTION

One aspect of the invention provides a method of generating, revising, or extending a road network of a digital map. The method includes providing a plurality of probe traces extending across a geographical area; and providing a plurality of threads employing the probe traces to generate networks of road segments. The method includes dividing the probe traces into a plurality of sub-sets, wherein each sub-set includes a plurality of probe traces having at least one criteria in common. The method next includes employing probe traces of a first sub-set by a first thread; and employing probe traces of a second sub-set by a second thread while the first thread is employing the traces of the first sub-set. The step of employing probe traces by the thread includes generating a network of road segments independent of the networks generated by the other threads; and combining at least one road segment of the independent networks with road segments of another independent network or with a road segments of an existing network to generate a seamless network of road segments for a digital map.

The criteria may be selected from the group consisting of: accuracy of the probe traces, quality of the probe traces, position of the probe traces, and timestamp of the probe traces.

The method may include determining the accuracy of each of the probe traces, and said dividing includes dividing the probe traces into the sub-sets based on accuracy.

An independent network may be generated by a thread using sub-sets having a higher accuracy relative to other independent networks generated by other threads using sub-sets having a lower accuracy, and the method may include identifying differences between the network generated using the sub-sets having a higher accuracy and the networks generated using the sub-sets having a lower accuracy, and said combining includes employing the networks having a higher accuracy.

An independent network may be generated by a thread using sub-sets having a higher accuracy relative to other independent networks generated by other threads using sub-sets having a lower accuracy, and the method may include identifying a road segment generated using set-sets having a higher accuracy that is missing in another independent network or a preexisting network; and said combining includes generating the missing road segment.

An independent network may be generated by a thread using sub-sets having a higher accuracy relative to other independent networks generated by other threads using sub-sets having a lower accuracy, and said combining may include employing the road segments generated by sub-sets having a higher accuracy before employing the road segments generated by the sub-sets having the lower accuracy.

The combining may include matching a road segment of one independent network with a road segment of another independent network or an existing network, and wherein said combining includes generating the matching road segment.

The method may include identifying differences between the matching road segment of the independent networks and a road segment of a preexisting network, and revising the road segment of the preexisting network to match the road segment of the independent networks.

The method may include identifying that the matching road segment of the independent networks is missing in a preexisting network, and generating the missing road segment in the preexisting road network.

The method may include matching road segments of the independent networks to road segments of the preexisting road networks to verify accuracy of the road segments of the preexisting network.

The plurality of probe traces may be provided simultaneously, and said dividing may include distributing a predetermined number of probe traces to each of the sub-sets.

Each thread may employ each probe trace of one sub-set before employing each probe trace of another sub-set.

Each sub-set may be placed in a queue and each thread employs the traces of one sub-set of the queue before employing the probe traces of another sub-set of the queue.

Another aspect of the invention provides a system for generating, revising, or extending a road network of a digital map, comprising a plurality of probe traces extending across a geographical area. The probe traces are divided into a plurality of sub-sets, wherein the probe traces of each sub-set have at least one criteria in common. A plurality of threads each employ the probe traces of a sub-set to generate a network of road segments while the other threads employ traces of other sub-sets to generate networks of road segments. Each network of road segments is generated independently of the other networks of road segments. Each of the independent networks are combined with at least one other network to generate a seamless network of road segments for a digital map.

The plurality of threads each employ entire threads extending across the entire geographical area and cooperatively generate, extend, and revise the network of the large geographical area. Therefore, seaming of individual tiles of the geographical area is not needed, and the errors associated with the seaming steps are avoided. By using multiple threads to simultaneously employ the traces extending across the geographical area, the inventive system and method can efficiently generate and update the network of the large geographical area, such as a country or the world. The inventive system and method provide a quick, reliable, and cost effective way to generate and update digital maps of large geographical areas.

It will be appreciated that the present invention utilizes multithreading in the generation and updating of digital maps. Multithreading in general is a method of parallelized computing, e.g. in which one program uses different threads (also referred to herein as "processing threads") in order to compute different things at the same time. The several threads run independently of each other but they can share resources and exchange data. It is common to use multiple threads on multiprocessor systems, e.g. computer systems that have multiple CPUs, CPUs with multiple cores, or consist of a cluster of machines. The threads can be distributed over the different processors, thereby resulting in faster processing times and a better trade on of the resources. However even for single processor systems multithreading can be used to accelerate the computation. A simplified example shows why: suppose we have a system with two resources: a CPU and a database. Furthermore we have a program which consists of two steps: in the first step several computations are made on the CPU and in the second step the results are written into the database. If the program runs in a single threading mode during the first step the database in unused whereas in the second step the CPU is unused. On the contrary if we use different threads one thread is maybe at step 1 and uses only the CPU. At the same time another thread is maybe at step 2 and uses only the database access. So we have a better trade on of the resources and that results in a faster computing time. Accordingly, it will be understood that the multithreading techniques used in the computer implemented methods of the present invention can operate on single processor computer systems, but preferably will operate on multiple processor computer systems.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, a system and method for generating a seamless network, such as a road network, of a geographical area for use in a digital map is generally shown. A plurality of probe traces, preferably GPS traces from probe data, extend across the geographical area, and a plurality of threads employ the traces. Each of the threads can employ one of the traces while another one of the treads employs another one of the traces to cooperatively generate a single, accurate seamless network of the geographical area.

The term "generating" used throughout the subject application, includes generating as well as revising and extending the network. The inventive system and method can generate the seamless network of a large geographical area, without using the error susceptible seaming step of the prior art.

Figure 1:
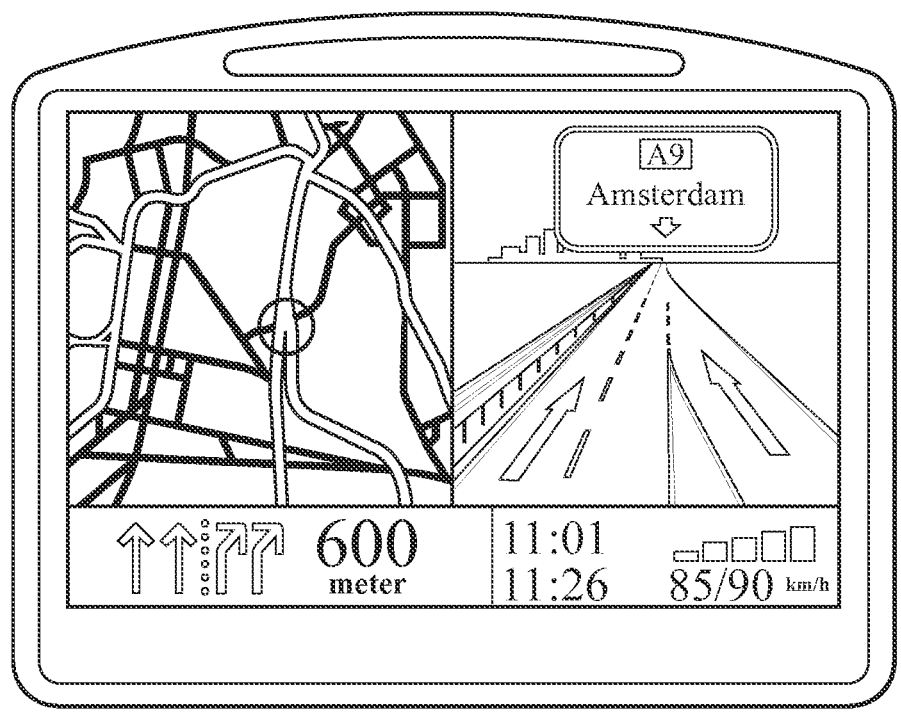
FIG. 1 is an exemplary view of a portable navigation system according to an embodiment of the invention including a display screen for presenting information and a digital map including a road network of a geographical area to a user.

An exemplary digital map of the system is shown in FIG. 1. The digital map of FIG. 1 is included in a compact, portable vehicle navigation device. Alternatively, the digital map may be included in other types of navigation devices, such as a handheld device, PDA, or mobile phone with navigation software. The digital map includes a plurality of digital road segments displayed on a screen. Each digital road segment corresponds to, or is intended by the map provider to correspond to, a real-life road segment. The digital road segments may comprise an entire road, or portion of a road extending between two nodes, two junctions, a node and a junction, or between other parameters. The road segments are displayed on the screen through a bird's eye view, a junction view, or other another view.

In addition to the digital map, the navigation device typically includes a GPS receiver and a probe. As the navigation device travels along the real-life road segments, the probe collects probe data indicating the location of the probe and other information, such as travel direction, speed of the traveling probe. The probe may transmit or otherwise report its probe data to the map provider at certain time segments. The map provider preferably collects the probe data from the probes and uses the probe data to generate, extend, and revise the road network of digital maps, which will be discussed further. The map provider can collect the probe data from other sources of probes.

The map provider strives to collect and maintain probe data for each digital road segment of the digital map. The probe data of each digital road segment typically includes a count for each probe traveling along the real-life road segment corresponding to the digital road segment. The probe data of each road segment can be collected in real-time or at numerous points in time, such as on a quarterly basis. As the probes travel or drive along the road segments, their probe data points form GPS or probe traces, indicating location and other travel behavior of the probe along the road segments.

Each probe trace includes a sequence of position information. The probe trace typically includes a timestamp, indicating the time the corresponding probe was positioned at particular locations along the road segment. The probe trace may also include additional data, such as speed of the probe, acceleration, heading, and accuracy of the probe trace. As alluded to above, the probe trace represents the movement of a probe, which is typically an automotive vehicle, bicycle, pedestrian, or another object moving along the road segment. The position data of the probe trace can be represented by a two or three dimension coordinate system. The timestamp and other time information can be represented in an implicit way or can be omitted. Equidistant time intervals are often used. The method typically includes storing the timestamp of the first probe data point of the probe trace traveling along the road network.

The probe data, traces, and other digital map information is typically stored and updated in a database maintained by the map provider. The map provider typically employs a satellite, wireless communication, software programs, and other devices known in the art to remotely and passively collect the probe data. The probe data is typically collected from probes of navigation devices, but can be collected from other types of probes.

The map provider strives to generate and maintain accurate digital maps including networks of large geographical areas. The networks typically include road segments and can include landmarks, and other features, attributes and points of interest. The invention provides an improved system and method for generating, revising, and extending networks of geographical areas, particularly large geographical areas, such as a country or the entire world. The method typically includes generating revising and extending road segments, but can include generating, revising, and extending landmarks, and other features, attributes and points of interest.

As alluded to above, the method includes collecting or providing a plurality of the probe traces formed by probe data traveling in the geographical area. The probe traces are obtained from a source of probe data. Each of the probe traces includes a plurality of probe data points. The traces can be provided by the map provider or obtained from another source. The traces are disposed throughout the geographical area and extend over significant areas and numerous portions of the geographical area. The traces typically extend along a road segment of the geographical area, such as along an interstate highway extending at least 100 miles.

As alluded to above, the method includes a multithreading process. Multithreading is a method of performing multiple computations and thus providing multiple results at the same time, wherein a plurality of threads operate independent of each other, but are able to share resources and exchange information. For example, the threads can be distributed over several different processors of a multiprocessor system so that the multithreading process provides more efficient use of resources and results in less processing time. The multithreading process preferably employs a means to prevent the threads from disturbing one another. As discussed above, multithreading processes used to generate networks of large geographical areas typically include dividing the geographical area into a plurality of sections or tiles, such as by a Morton Tiling schema, and then every thread employs the traces of that that one tile to generate a portion of the network in only the one tile. However, to form a single road network of the entire large geographical area, the independent road segments of the individual tiles must be seamed together, which typically leads to errors in the road network.

The multithreading process of the present invention includes the plurality of threads each employing probe traces simultaneously. Each of the threads independently employs different traces to independently generate a network of road segments of the same geographical area, such that the plurality of threads do not disturb one another. A plurality of threads simultaneously employ traces extending across the large geographical area, not just a portion of the trace extending across only a portion of the large geographical area.

A first thread employs probe traces to generate a network of road segments of the geographical area while a second thread employs different probe traces to generate another network of road segments of the same geographical area. The independent networks generated are then combined with one another or a preexisting road network to provide an accurate seamless road network for a digital map. Combining the plurality of networks can including conflating the networks.

The probe traces can be provided to the plurality of traces incrementally or non-incrementally. Before the probe traces are distributed to and employed by the threads, the method includes dividing the probe traces into a plurality of sub-sets. Each sub-sets includes a plurality of the probe traces. Each probe trace of a single sub-set has at least one criteria in common with one another. The criteria can be selected from the group consisting of accuracy of the probe traces, quality of the probe traces, position of the probe traces, and timestamp of the probe traces. However, other criteria can be used.

Figure 2:
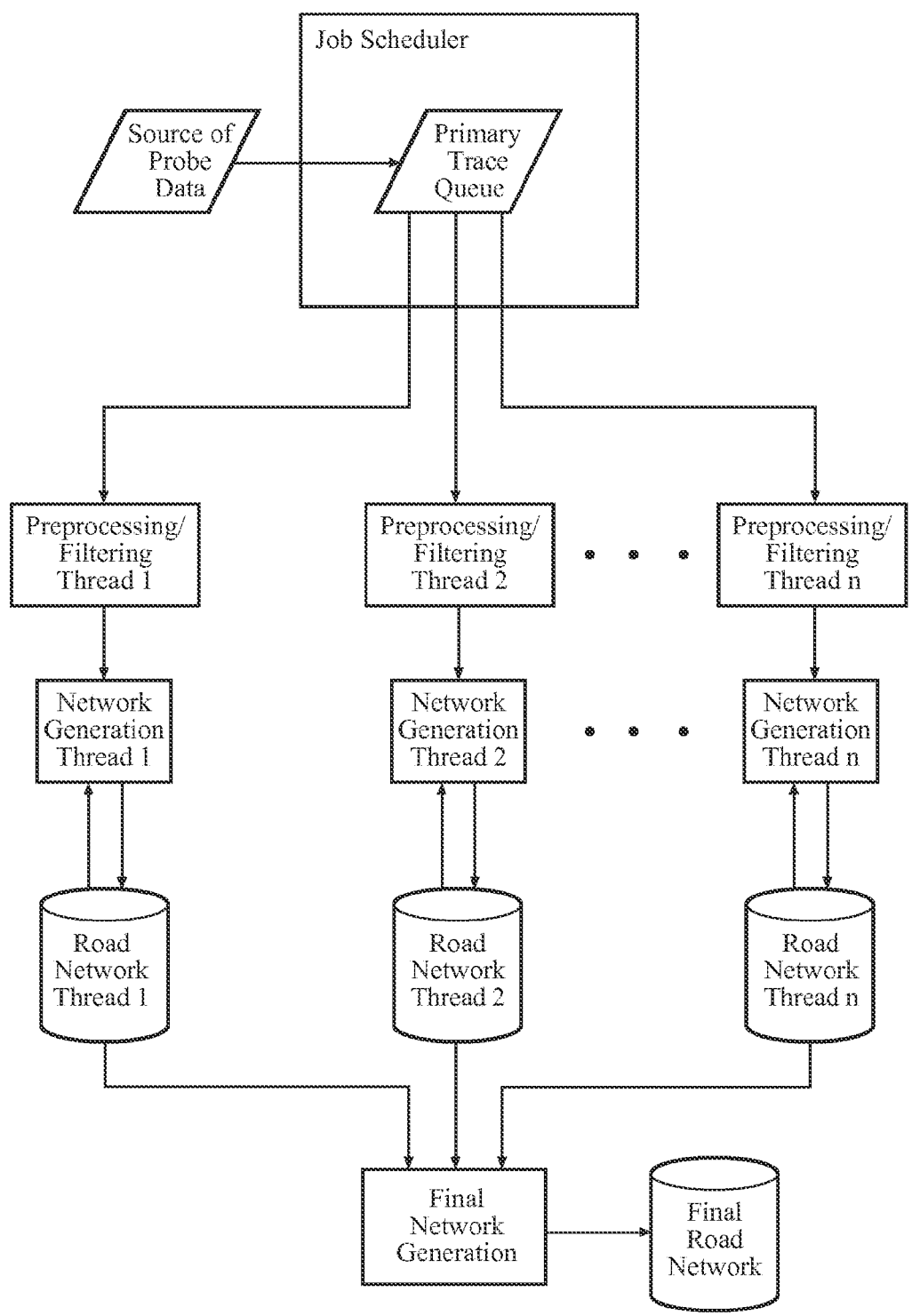
FIG. 2 is a flow chart illustrating method steps of the subject invention.

In one preferred embodiment, the method includes determining the accuracy of each probe trace, and dividing the probe traces into sub-sets based on accuracy. For example the step of dividing the probe traces to different sub-sets can include distributing probe traces having similar accuracies to the same sub-set. In one preferred embodiment, the method includes distributing probe traces determined to have a higher accuracy than other probe traces to a first sub-set, and distributing probe traces determined to have a lower accuracy, or being less accurate that the probe traces of the first sub-set, to a second sub-set. Accuracy refers to accuracy of the time and position data of the probe traces. The method can include preprocessing of the probe traces to determine accuracy of each probe traces provide a group of probe traces having more accurate position data than another group of probe. The preprocessing can also be used to provide a group of probe traces having a higher quality than another group of probe traces. A job scheduler is used to divide the probe traces into the sub-sets, and distribute the probe traces or sub-sets of probe traces to the threads. In one embodiment, the method includes an incremental map generation process, as shown in FIG. 2, wherein the job scheduler divides probe traces into sub-sets incrementally as the probe traces become available. The job scheduler also distributes the sub-sets of probe traces from the trace queue to the probe traces as the sub-sets become available. Once the thread finishes employing one of the sub-sets, the job scheduler transfers another one of the sub-sets from the primary trace queue to the thread.

Figure 3:
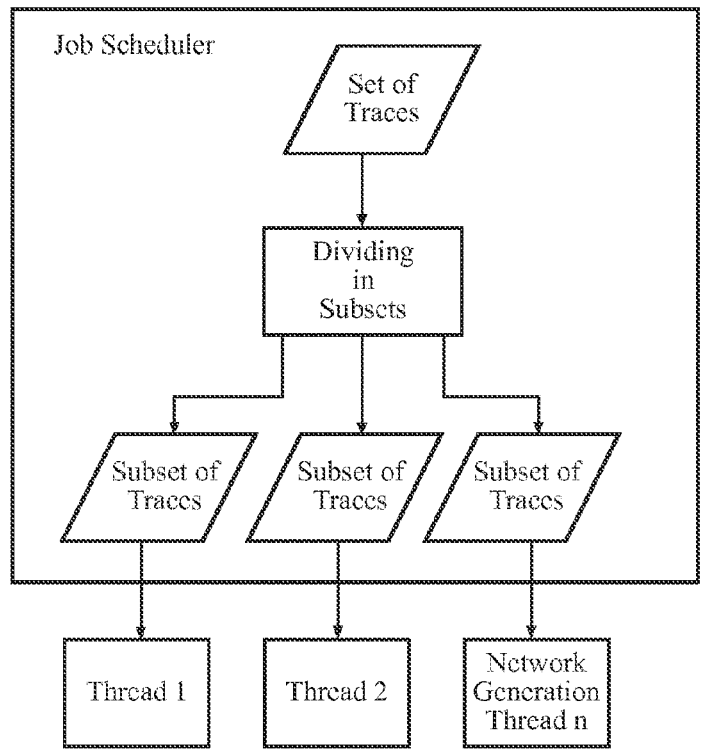
FIG. 3 is a flow chart illustrating a job schedule of one embodiment of the subject invention.

In another embodiment, the method includes a non-incremental map generation process, wherein a predetermined fixed number of traces, and the job scheduler divides the fixed number of traces to several sub-sets each having at least one criteria in common, and then distributing each of the sub-sets to the plurality of threads, as shown in FIG. 3.

Figure 4:
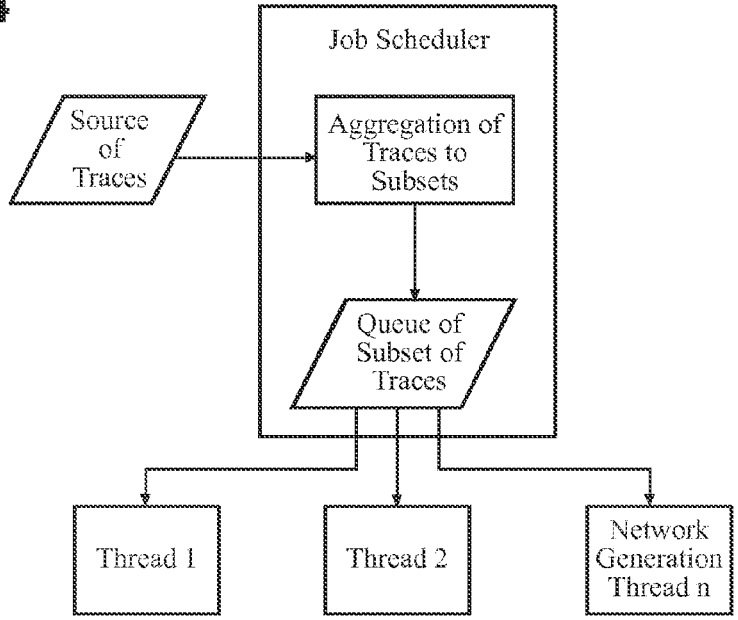
FIG. 4 is a flow chart illustrating a job scheduler of a second embodiment of the subject invention.

In yet another embodiment, the non-incremental method of FIG. 2 is employed incrementally. As shown in FIG. 4, the job scheduler puts the sub-sets including the predetermined number of traces in a queue. The method includes distributing each sub-set of traces from the queue to one of the thread. The thread then takes the sub-set of traces and processes it. After processing the sub-set, the method includes distributing another sub-set from the queue to the thread, and the thread then takes the sub-set of traces and process it. The method includes simultaneously distributing the sub-sets to the plurality threads, and each of the threads simultaneously employs one of the sub-sets.

The step of employing the probe traces of the sub-sets includes generating a network of road segments. Each thread simultaneously employs the probe traces to generate a seamless network of road segments of the entire geographical area independent of the other threads and the other independent seamless networks. Any map generation process known in the art can be used to generate the independent network by the thread. The probe traces may generate road segments indicating the geographical area includes an interstate highway extending thousands of miles and across several states. Each thread can process traces extending along interstate highways while another one of the threads is processing traces extending along the same interstate highway. In other words, two different threads can simultaneously employ any two traces, even if the two traces extend across each other.

Each independent network will include a plurality of road segments of the same large geographical area. However, each independent network typically has missing or inaccurate road segments. Thus, the method includes the combining or conflating step to combine the plurality of independent road networks to more a more complete and accurate seamless network of road segments. The seamless network of road segments can be used in a digital map, such as the digital map of FIG. 1.

The combining or conflating step includes combining at least one of the road segments of one of the independent networks with another road segment of another independently generated road network or a road segment of an existing network to generate a seamless network of road segments of a digital map. The combining or conflation step can include combining each of the independent networks to generate the final seamless road network of the geographical area, shown as the "Final Network Generation" step of FIG. 2. The step of combining the independent seamless road networks includes any type of network-to-network map matching process, such as described in WO 2009/083033 and U.S. Pat. No. 6,564,224. The network-to-network map matching process should consider topological connections of the plurality of independent seamless networks. The network-to-network map matching process does not include the error susceptible step of seaming tiles together.

When the probe traces are divided into sub-sets based on accuracy, one independent network is generated by a thread using sub-sets having a higher accuracy relative to other independent networks generated by other threads using sub-sets having a lower accuracy. The method then includes identifying differences between the network generated using the sub-sets having a higher accuracy and the networks generated using the sub-sets having a lower accuracy. The combining step then includes employing the network having a higher accuracy to generate the seamless network. The method includes limited use of networks having a lower accuracy.

The method can also include identifying a road segment generated using set-sets having a higher accuracy that is missing in another independent network generated using probe traces or sub-sets having a lower accuracy or a preexisting network. The step of combining then includes generating the missing road segment in the seamless network.

The step of combining preferably includes employing the road segments generated using the sub-sets having a higher accuracy before employing the road segments generated using the sub-sets having the lower accuracy. Typically the network generated using the sub-sets having a higher accuracy is also of high quality. However, the network generated using the sub-sets having a higher accuracy may not be complete, in which case road segments of other networks generated using the sub-sets having a lower accuracy are used to extend the network of higher accuracy. The step of combining or conflating can be configured to prefer the networks of higher accuracy and quality, and employ those networks over networks of lower accuracy and quality.

The method can also include matching a road segment of one independent network with a road segment of another independent network or an existing network. Then, the step of combining includes generating the matching road segment in the seamless road network of the digital map.

In another embodiment, the method includes identifying differences between the matching road segment of the independent networks and a road segment of a preexisting network. The method can then include revising the road segment of the preexisting network to match the road segment of the independent networks. The method can also include identifying that the matching road segment of the independent networks is missing in a preexisting road network, and generating the road segment of the independent networks in the preexisting network.

The method can also including matching road segments of the independent networks to road segments of the preexisting network to verify accuracy of the preexisting network.

The inventive system and method includes at least two threads, but can include up to an infinite number of threads (n), as shown in FIG. 2, wherein n is an integer. The number of threads (n) depends on the amount of probe data, the size of the geographical area, the number of processors, and the size of the preexisting road network, if any network already exists. In one typical embodiment, the system includes two threads per processor. The optimal number of threads can be tested prior to implementation of the inventive system and method.

As stated above, the method can also include preprocessing or filtering the probe traces before transferring the sub-sets of probe traces from the primary trace queue to the threads, as shown in FIG. 2. The preprocessing or filtering of the probe traces can also be done before the job scheduler, such as before transferring the probe traces from the probe data source to the primary trace queue. The filtering step removes errors typically contained in the probe data, such as wrong positions, zigzags, gaps, or time jumps, to provide traces accurately indicating the road segments or other features of the geographical area. The preprocessing can also include determining the criteria of the probe traces. The amount and type of preprocessing typically depends on the quality of the probe data and the probe traces provided.

The inventive system and method provides an improved method of generating, revising, and extending networks of geographical areas, particularly road networks of large geographical areas, such as a country or the world. The inventive system and method generates a seamless network, which reduces errors in the generated network, compared to the prior art methods that include seaming tiles of the geographical area together. The inventive system and method can also generate the networks of large geographical areas in less time, compared to methods of the prior art.

It will be understood that the general concepts of this invention can be used to improve any digital map, not only roadway and pathway maps (e.g. for vehicles, bicycles, pedestrians, ec). For example, circuit diagrams, schematics, and other graphical representations that can be spatially associated within a coordinate system may benefit from the techniques of this invention.

Elements and/or features of different example embodiments can be combined with each other and/or substituted for each other within the scope of the disclosure and appended claims. Still further, any one of the above-described and other example features can be embodied in the form of an apparatus, method, system, computer program and computer program product. For example, any of the aforementioned methods may be embodied in the form of a system or device, including, but not limited to, any of the structure for performing the methodology illustrated in the drawings.

Whilst embodiments described in the foregoing detailed description refer to GPS, it should be noted that the navigation apparatus may utilise any kind of position sensing technology as an alternative to (or indeed in addition to) GPS. For example, the navigation apparatus may use other global navigation satellite based such as the European Galileo system. Equally, it is not limited to satellite based, but could readily function using ground based beacons or any other kind of system that enables the device to determine its geographic location.

The foregoing description of the invention is exemplary rather than limiting in nature. Variations and modifications to the disclosed embodiment may become apparent to those skilled in the art and fall within the scope of the invention. Accordingly, the scope of protection afforded to this invention is defined only by the following claims.

The invention claimed is:

1. A method of generating, revising, or extending a digital map, said digital map storing a plurality of line segments or features spatially associated within a coordinate system representing a network within a geographical area, comprising:
    providing a plurality of probe traces extending across a geographical area, wherein the probe traces are a plurality of location measurements;
    dividing the probe traces into a plurality of sub-sets, wherein each sub-set includes a plurality of probe traces having at least one criteria in common, the criteria being an accuracy of the probe traces or a quality of the probe traces;
    employing probe traces of a first sub-set using a first processing thread to generate a first sub-network of line segments;
    employing probe traces of a second sub-set using a second processing thread, while the first processing thread is employing the traces of the first sub-set, to generate a second sub-network of line segments; and
    conflating at least said first and second sub-networks of line segments to generate a network of line segments associated with the geographical area, the conflating comprising:

using line segments from the first sub-network to generate the network of line segments for locations where the first sub-network is complete; and using line segments from the second sub-network to generate the network of line segments for locations where the first sub-network is incomplete.

2. A method as set forth in claim 1 including conflating at least one of said first and second sub-networks of line segments with a pre-existing network of line segments of a digital map.

3. A method as set forth in claim 1 wherein an additional criteria is selected from the group consisting of: position of the probe traces, and timestamp of the probe traces.

4. A method as set forth in claim 1 including determining the accuracy of each of the probe traces, and said dividing includes dividing the probe traces into the sub-sets based on accuracy.

5. A method as set forth in claim 1 including associating the common criteria of each sub-set of probe traces with the sub-network of line segments generated using said sub-set of probe traces.

6. A method as set forth in claim 5 wherein said conflating includes conflating at least said first and second sub-networks of line segments based on the criteria associated with each sub-network.

7. A method as set forth in claim 1 including matching one or more line segments or features of a generated sub-network of a known accuracy with corresponding line segments or features of a pre-existing network of line segments of a digital map to verify the accuracy of the pre-existing network.

8. A method as set forth in claim 1 wherein the plurality of probe traces are provided simultaneously.

9. A method as set forth in claim 1 wherein said dividing includes distributing a predetermined number of probe traces to each of the sub-sets of probe traces.

10. A method as set forth in claim 1 wherein each processing thread employs each probe trace of one sub-set before employing a probe trace of another sub-set.

11. A method as set forth in claim 1 wherein each sub-set of probe traces is placed in a queue and each processing thread employs the probe traces of one sub-set of the queue before employing the probe traces of another sub-set of the queue.

12. A method as set forth in claim 1, wherein the digital map is a transportation network, and wherein the line segments represent at least a portion of a road.

13. A system of generating, revising, or extending a digital map, said digital map storing a plurality of line segments or features spatially associated within a coordinate system representing a network within a geographical area, comprising:

means for receiving a plurality of probe traces extending across a geographical area, wherein the probe traces are a plurality of location measurements;

means for dividing the probe traces into a plurality of sub-sets, wherein each sub-set includes a plurality of probe traces having at least one criteria in common, the criteria being an accuracy of the probe traces or a quality of the probe traces;

one or more processing resources arranged to employ probe traces of a first sub-set using a first processing thread to generate a first sub-network of line segments and to employ probe traces of a second sub-set using a second processing thread, while the first processing thread is employing the traces of the first sub-set, to generate a second sub-network of line segments; and means for conflating at least said first and second sub-networks of line segments to generate a network of line segments associated with the geographical area, the conflating comprising:

using line segments from the first sub-network to generate the network of line segments for locations where the first sub-network is complete; and using line segments from the second sub-network to generate the network of line segments for locations where the first sub-network is incomplete.

14. A system as set forth in claim 13 wherein an additional criteria is selected from the group consisting of: position of the probe traces, and timestamp of the probe traces.

15. A system as set forth in claim 13, wherein the criteria is the accuracy of each of the probe traces, and said means for dividing the probe traces into a plurality of sub-sets is arranged to divide the probe traces into the sub-sets based on accuracy.

* * * * *